United States Patent [19]

Nam et al.

[11] Patent Number: 5,546,428
[45] Date of Patent: Aug. 13, 1996

[54] DIFFERENTIALLY ENCODING QUADRATURE PHASE SHIFT KEYING MODULATION METHOD AND APPARATUS THEREOF

[75] Inventors: Il-hyun Nam, Seoul; Kwan-seong Kim, Bucheon, both of Rep. of Korea

[73] Assignee: Samsung Electronics Co., Ltd., Kyungki-Do, Rep. of Korea

[21] Appl. No.: 132,262

[22] Filed: Oct. 6, 1993

[30] Foreign Application Priority Data

Mar. 30, 1993 [KR] Rep. of Korea .................. 93-5124

[51] Int. Cl.[6] .................. H04L 27/20; H04L 27/10; H03K 7/06; H03C 3/00
[52] U.S. Cl. .................. 375/308; 375/283; 375/271; 332/103
[58] Field of Search .................. 375/308, 283, 375/271, 330, 331, 332, 329, 322, 271, 280, 281; 332/103, 104, 105

[56] References Cited

U.S. PATENT DOCUMENTS

| | | | |
|---|---|---|---|
| 5,140,613 | 8/1992 | Birgenheier et al. | 375/67 |
| 5,222,103 | 6/1993 | Gross | 375/54 |
| 5,260,673 | 11/1993 | Pham | 332/103 |
| 5,261,120 | 11/1995 | Suzuki et al. | 375/308 |
| 5,325,075 | 6/1994 | Rapeli | 332/103 |
| 5,363,410 | 11/1994 | Hayashi | 375/67 |

Primary Examiner—Edward L. Coles, Sr.
Assistant Examiner—Allen A. Esposo

[57] ABSTRACT

A differentially encoded quadrature modulation method comprises the steps of setting an index corresponding to a phase variation value constituted of input data, forming a phase value to obtain a phase-modulated output phase value from a given table and forming a channel signal to obtain in-phase (I) and quadrature (Q) channel signals from a given table using the phase value. The apparatus for performing the above comprises a signal converter for converting serially input data into two binary signal trains, a signal forming portion for obtaining channel signals, a digital-to-analog converter for converting the respective signals into two analog signals, a baseband filter for baseband-pass-filtering the signals, a phase shifter for shifting a carrier by 90°, first and second multipliers for multiplying the filtered signals with the carrier and phase-shifted carrier, respectively, and a mixer for mixing the respectively obtained signals and outputting a combined signal. Accordingly, the phase difference according to symbol is implemented after being assigned to the corresponding index value stored in a look-up table. The final modulation output phase together with the previous phase value is directly obtained by using the look-up table. Accordingly, the construction of the circuit is simplified and the size of the chip is reduced for lower power consumption. Also, modulation speed is improved and a reliable modulation signal can be formed.

12 Claims, 5 Drawing Sheets

DIFFERENTIALLY ENCODING QUADRATURE PHASE SHIFT KEYING MODULATION METHOD AND APPARATUS THEREOF

BACKGROUND OF THE INVENTION

The present invention relates to a digital signal modulation apparatus, and more particularly, to a differentially encoding quadrature phase shift keying (DEQPSK) modulation apparatus and method thereof, capable of simplifying circuitry and improving modulation speed.

For digital data transmission, a binary waveform is superposed onto a carrier. Data transmission methods such as amplitude modulation (AM), phase modulation (PM) and frequency modulation (FM) are chiefly used. Also used frequently is a system involving the mixture of AM modulation and PM modulation such as a quadrature amplitude modulation (QAM) method.

A signal processed by a binary phase shift keying (BPSK) modulation method is one having a fixed amplitude. When the data is placed in a certain level, the data has a fixed phase, while when the data is placed in a different level, the phase of the data is shifted by 180°. Actually, a BPSK-modulated signal is produced by applying a waveform as a digital time oscillator carrier and a baseband signal as a modulation waveform, to a balanced modulator.

Further, differential phase shift keying (DPSK) modulation and differentially encoded phase shift keying (DEPSK) modulation are variations of the BPSK modulation method, which have the added advantage of removing the uncertainty as to whether the demodulated data has been inverted. Particularly advantageous, DPSK modulation does not require a sync carrier which is necessary for the demodulation of a received BPSK modulation signal. The DEPSK modulation method has a further advantage in that it does not require a delay unit which is necessary in the DPSK modulation apparatus.

Also, the quadrature phase shift keying (QPSK) modulation method is one for performing phase shifting in proportion to a value or an input symbol, in which only half of the bandwidth (in comparison with BPSK modulation) is necessary for the transmission of one bit of data.

Figure 1:
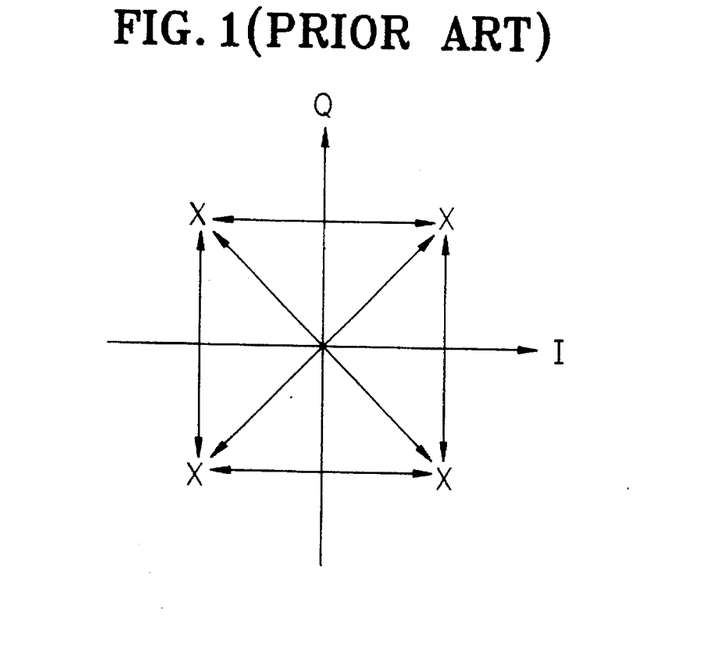
FIG. 1 is a graph showing constellation of a modulation signal in a QPSK modulation method.

FIG. 1 is a graphical diagram of constellation of a modulation signal in the QPSK modulation method, and shows that a phase difference of 90° is generated in the QPSK modulation method. On the other hand, a phase difference of 180° is generated in the BPSK modulation method.

The DEQPSK modulation method is one type of QPSK modulation, wherein modulation noise generated due to a sudden change of the phase value (or large differences therein) is reduced by varying the degree of phase shift generated between symbols. Here, the phase shift is $\pm\pi/4$ or $\pm\pi/4$ which are both integer multiples or $\pi/4$.

Figure 2:
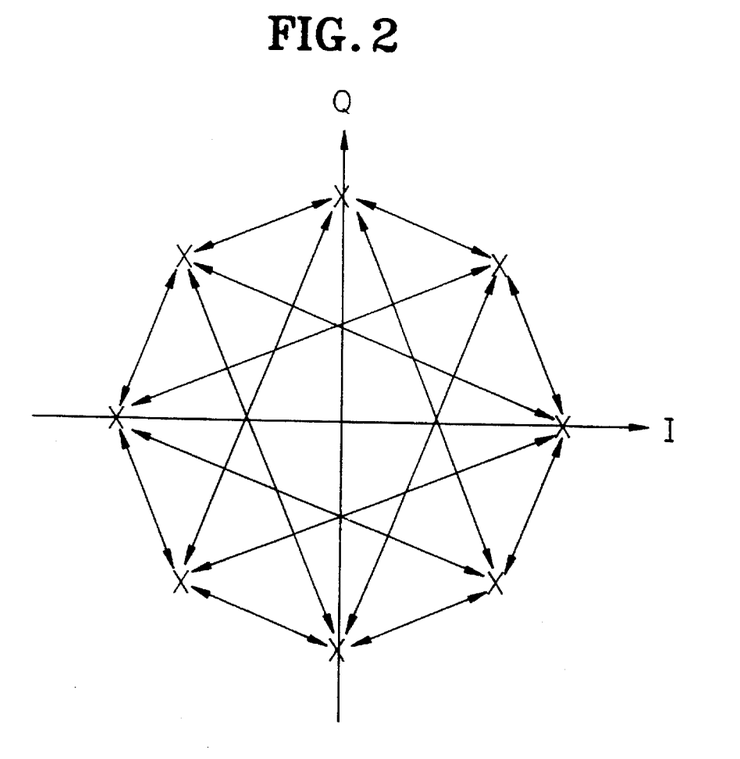
FIG. 2 is a graph showing constellation of a modulation signal in a DEQPSK modulation method.

FIG. 2 is a graphical diagram of constellation of a modulation signal in the DEQPSK modulation method.

Figure 3:
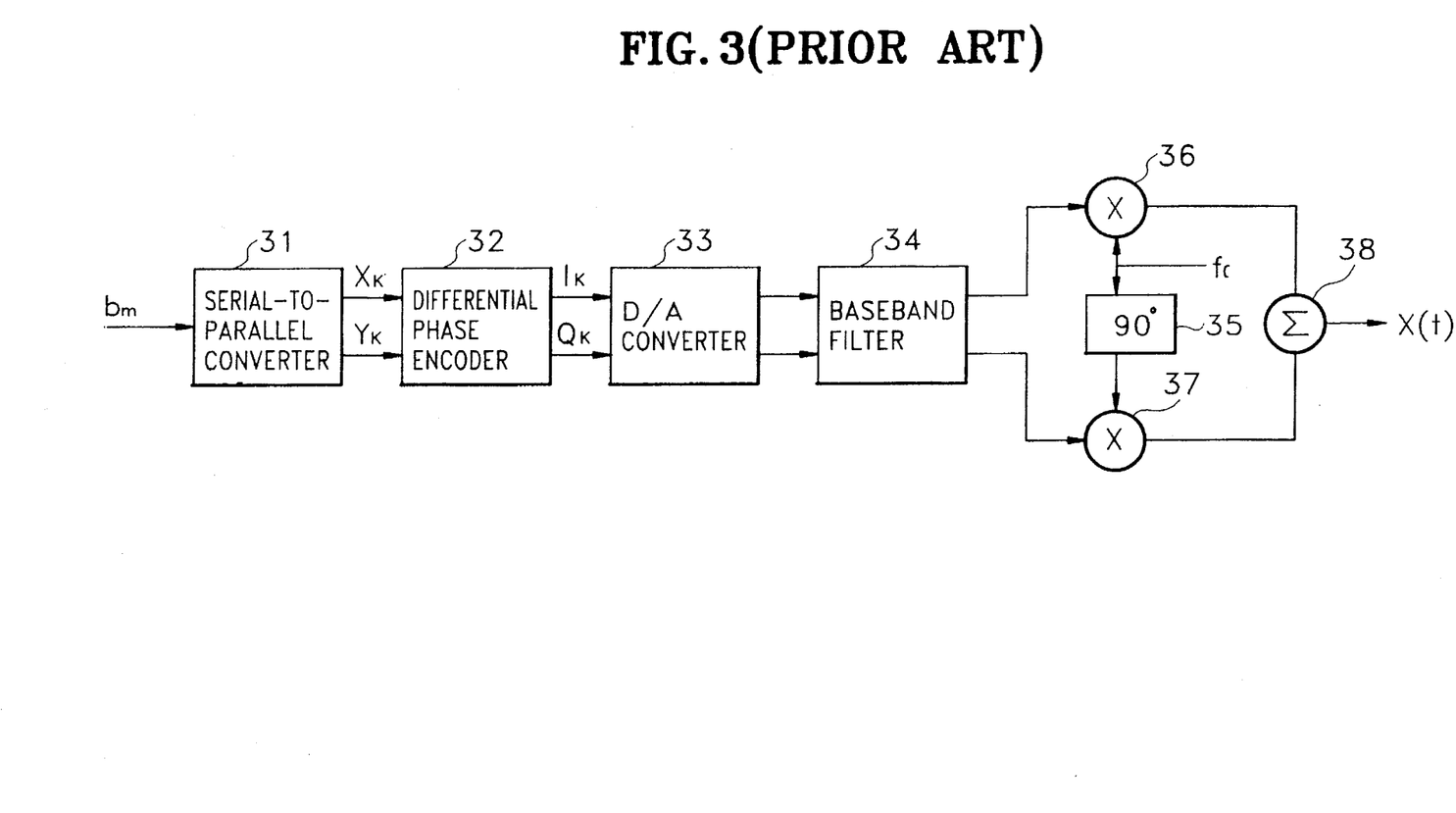
FIG. 3 is a block diagram of the conventional DEQPSK modulation apparatus.

FIG. 3 is a block diagram of a conventional DEQPSK modulation apparatus.

The DEQPSK modulation apparatus of FIG. 3 comprises a serial-to-parallel converter 31 for converting a serially input modulation signal train $b_m$ into two binary signal trains, a differential phase encoder 32 for encoding the converted signal as two signals of in-phase (I) and quadrature (Q) channels, a digital-to-analog converter 33 for converting signals $I_K$ and $Q_K$ obtained by differential phase encoder 32 into two analog signals, a baseband filter 34 for baseband-filtering the I- and Q-channel signals, a phase shifter 35 for shifting the phase of a carrier fc by 90° ($\pi/2$), first and second multipliers 36 and 37 for respectively multiplying the outputs of baseband filter 34 with the two phase-shifted signals, and a mixer 38 for mixing the signals supplied from multipliers 36 and 37 to output a combined signal X(t).

In the operation according to the above construction, serial-to-parallel converter 31 converts the signal train $b_m$ into the two signal trains, and outputs the converted signals. Differential phase encoder 32 encodes the above converted signals as I- and Q-channel signals ($I_K$ and $Q_K$), and outputs the encoded signals. The I- and Q-channel signals are converted into two analog signals via digital-to-analog converter 33. Thereafter, the analog signals are each baseband-pass-filtered via baseband filter 34, and the thus filtered signals are respectively multiplied with the carrier signal fc and the phase-shifted carrier in first and second multipliers 36 and 37. Then, the multiplied signals are combined through mixer 38 to complete the modulating process.

Here, as represented in Table 1, the modulation signal train $b_m$ is converted into the binary signal trains of odd-numbered bit train $X_K$ and even-numbered bit train $Y_K$, starting from the first bit of the signal train. Then, the combination of the two signal trains represents a phase difference $\Delta\phi$.

TABLE 1

| $X_K$ | $Y_K$ | $\Delta\phi$ |
|---|---|---|
| 1 | 1 | $-3\pi/4$ |
| 0 | 1 | $3\pi/4$ |
| 0 | 0 | $\pi/4$ |
| 1 | 0 | $-\pi/4$ |

The I- and Q-channel signals $I_K$ and $Q_K$ are represented as the following equations, as accomplished by differential phase encoder 32:

$$I_K = \{I_{K-1}\cos[\Delta\phi(X_K,Y_K)]\} - \{Q_{K-1}\sin[\Delta\phi(X_K,Y_K)]\}$$

$$Q_K = \{I_{K-1}\sin[\Delta\phi(X_K,Y_K)]\} - \{Q_{K-1}\cos[\Delta\phi(X_K,Y_K)]\}$$

wherein $I_K$ and $Q_K$ are the current values of the I- and Q-channels, and $I_{K-1}$ and $Q_{K-1}$ are the values at the preceding pulse.

The differentially encoded final phase value $\phi_K$ becomes a result of adding the phase variation value according to odd-numbered bit train $X_K$ and even-numbered bit train $Y_K$ to the phase value at the time of the preceding pulse. The differentially encoded final phase value $\phi_K$ is represented thus:

$$\phi_K = \phi_{K-1} + \Delta\phi$$

As described above, the conventional DEQPSK modulation method requires considerable calculation to obtain values $I_K$ and $Q_K$, and has a complicated structure in terms of hardware. Accordingly, embodiment of the conventional DEQPSK modulator as a single chip is very difficult due to the difficulty in minimizing its circuitry.

SUMMARY OF THE INVENTION

Therefore, to solve the above defects, it is an object of the present invention to provide a DEQPSK modulation method capable of simplifying a circuit and performing a high speed modulation.

It is another object of the present invention to provide a DEQPSK modulation apparatus capable of simplifying a circuit and performing a high speed modulation.

To accomplish the above object of the present invention, there is provided a DEQPSK modulation method for use in a method for forming I- and Q-channel signals of a DEQPSK modulation apparatus, the modulation method comprising the steps of:

setting a phase variation value index to obtain an index corresponding to a phase variation value constituted of input data:

forming a phase value to obtain a phase-modulated output phase value from a given table using the previous phase value and the set phase-variation-value index; and forming a channel signal to obtain in-phase (I) and quadrature (Q) channel signals in such a manner of obtaining I and Q projection values from a given table using the formed phase value.

To accomplish the other object of the present invention, there is provided a DEQPSK modulation apparatus comprising:

signal converting means for converting serially input data into two binary signal trains;

signal forming means for storing phase values corresponding to phase variation and projection values of the phase values and for reading the phase values corresponding to the two binary signal trains to obtain I- and Q-channel signals;

digital-to-analog converting means for converting the two signals obtained in the signal forming means into two analog signals, respectively;

baseband filtering means for baseband-filtering the signals output from the digital-to-analog converting means;

phase shifting means for shifting the phase of a carrier by 90° ($\pi/2$);

first and second multipliers for multiplying the two baseband-pass-filtered signals by the two phase-shifted signals, respectively; and mixing means for combining the signals output from the first and second multipliers and outputting a combined signal.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE INVENTION

Figure 4:
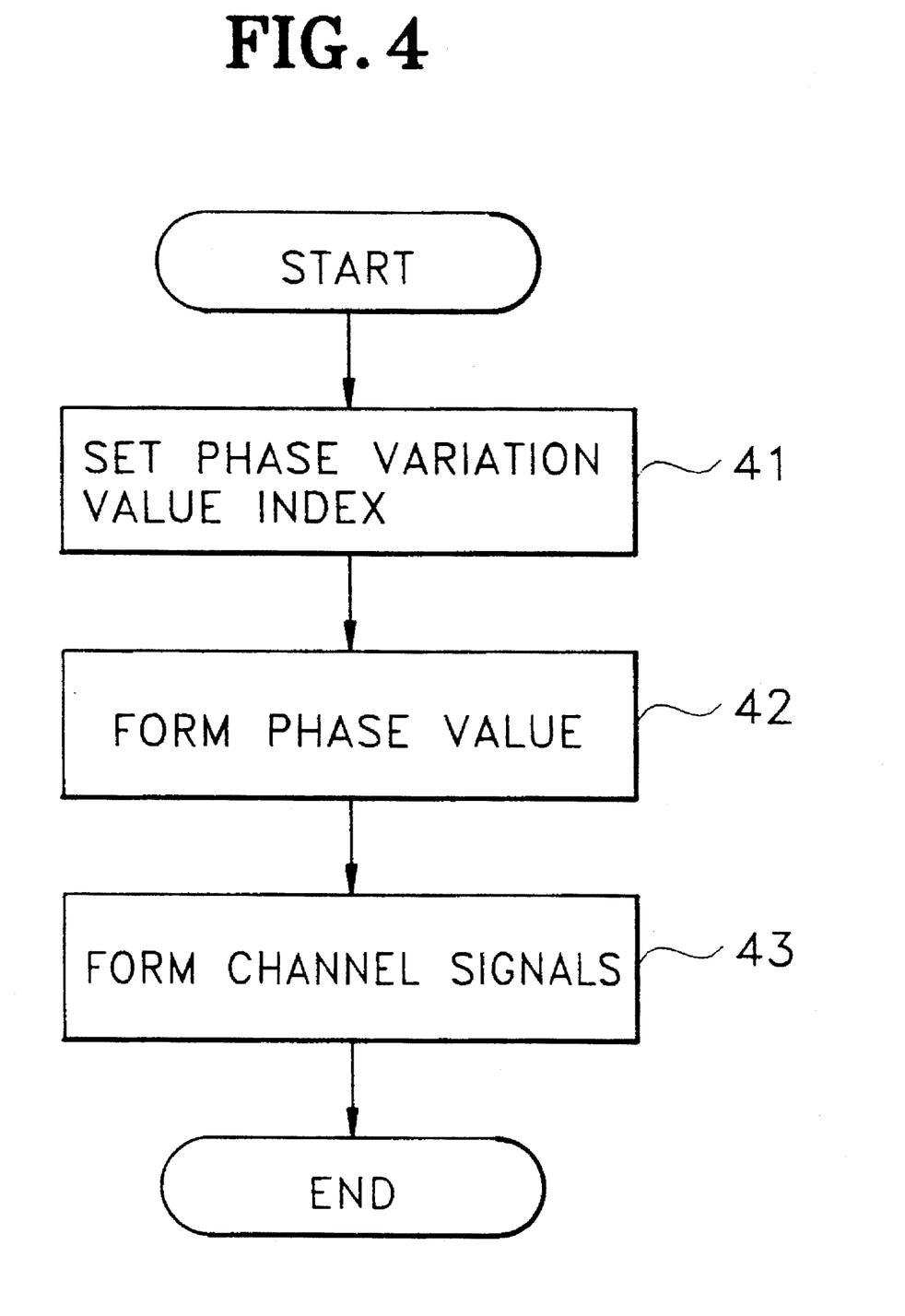
FIG. 4 is a flowchart diagram of a DEQPSK modulation method according to one embodiment of the present invention.

As shown in FIG. 4, a DEQPSK modulation method according to one embodiment of the present invention comprises the steps of setting a phase variation value index to obtain an index corresponding to a phase variation value constituted of input data (step 41), forming a phase value to obtain a phase-modulated output phase value from a given table using the previous phase value and the set phase variation value index (step 42), and forming a channel signal to obtain in-phase (I) and quadrature (Q) channel signals so as to obtain I and Q projection values from a given table using the formed phase value (step 43).

The operation according to the above steps will be described as follows.

In step 41 for setting the index, the serially input data is converted into two binary data trains for representing the degree of modulated phase variation. Here, the phase difference is obtained by way of combining the data trains. Then, an index is set with respect to the phase difference value and stored in a look-up table.

In step 42 for forming the phase value, the formed phase difference index and the previous phase value are used to form the phase-modulated output phase value, by way of reading the current phase value from the table.

In step 43 for forming the channel signal, the formed phase value is used to form the in-phase and quadrature channel signals corresponding to the formed phase value, by way of reading the I and Q projection values.

Figure 5:
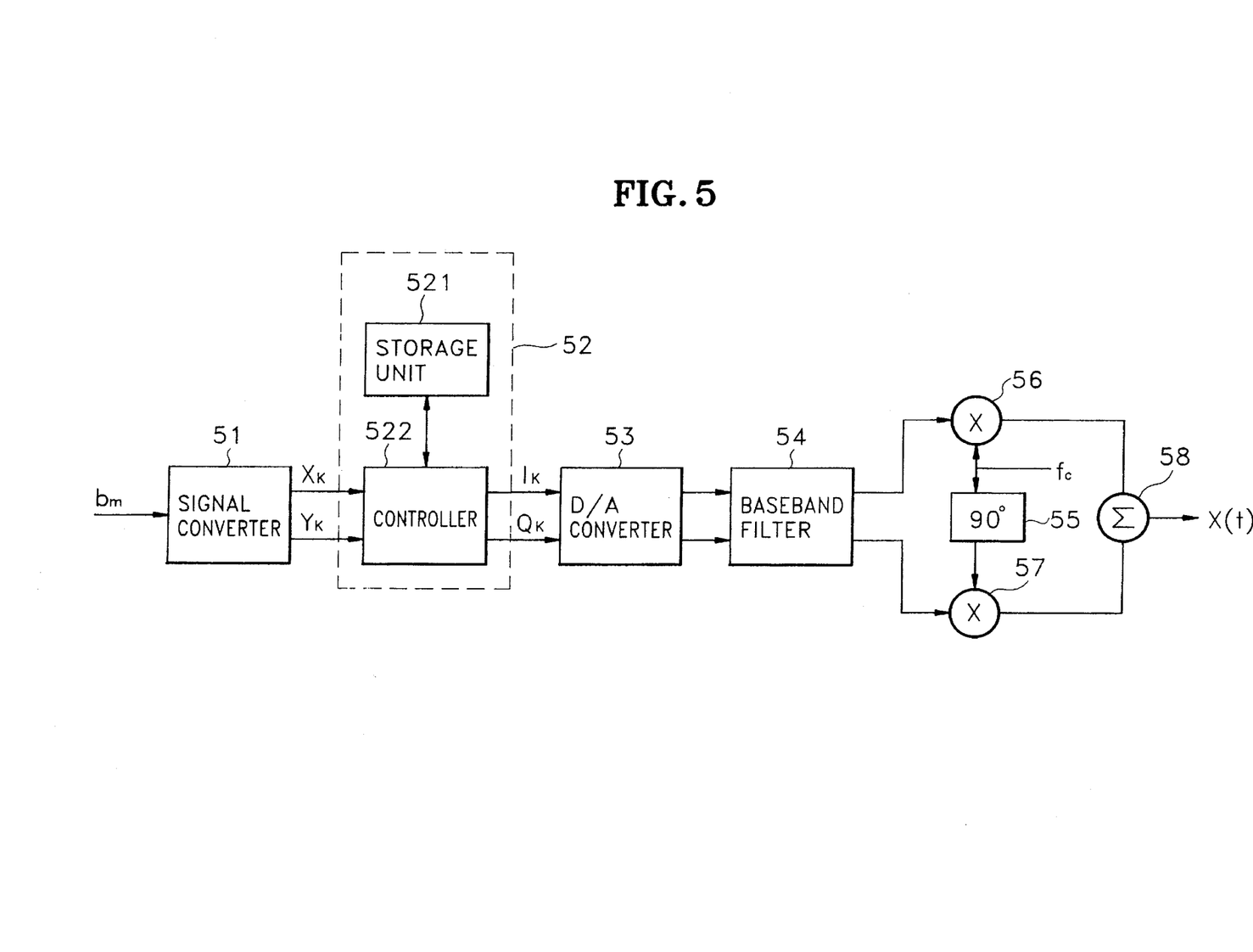
FIG. 5 is a block diagram of a DEQPSK modulation apparatus according to the present invention.

FIG. 5 is a block diagram of a DEQPSK modulation apparatus according to the present invention.

As shown in FIG. 5, the DEQPSK modulation apparatus according to the present invention comprises a signal converter 51 for converting the serially input modulation signal train $b_m$ into two binary signal trains, a signal forming unit 52 for storing phase values $\phi_K$ corresponding to phase variation and projection values of the phase values and reading phase values $\phi_K$ corresponding to the two input signal trains to obtain I- and Q-channel signals $I_K$ and $Q_K$, a digital-to-analog converter 53 for converting signals $I_K$ and $Q_K$ obtained in signal forming unit 52 into two analog signals, a baseband filter 54 for baseband-filtering the respective signals output from digital-to-analog converter 53, a phase shifter 55 for shifting the phase of a carrier fc by 90° ($\pi/2$), first and second multipliers 56 and 57 for multiplying the two baseband-filtered signals by the carrier and the phase-shifted-by-90° signals, respectively, and a mixer 58 for mixing the signals output from multipliers 56 and 57 and outputting a combined signal.

Signal forming unit 52 comprises a storage unit 521 for storing the phase value $\phi_K$ corresponding to the phase variation and the sine and cosine values of the phase value, and a controller 522 for obtaining the I- and Q-channel signals using the signal trains ($X_K$ and $Y_K$) and the phase value from storage unit 521.

Figure 6:
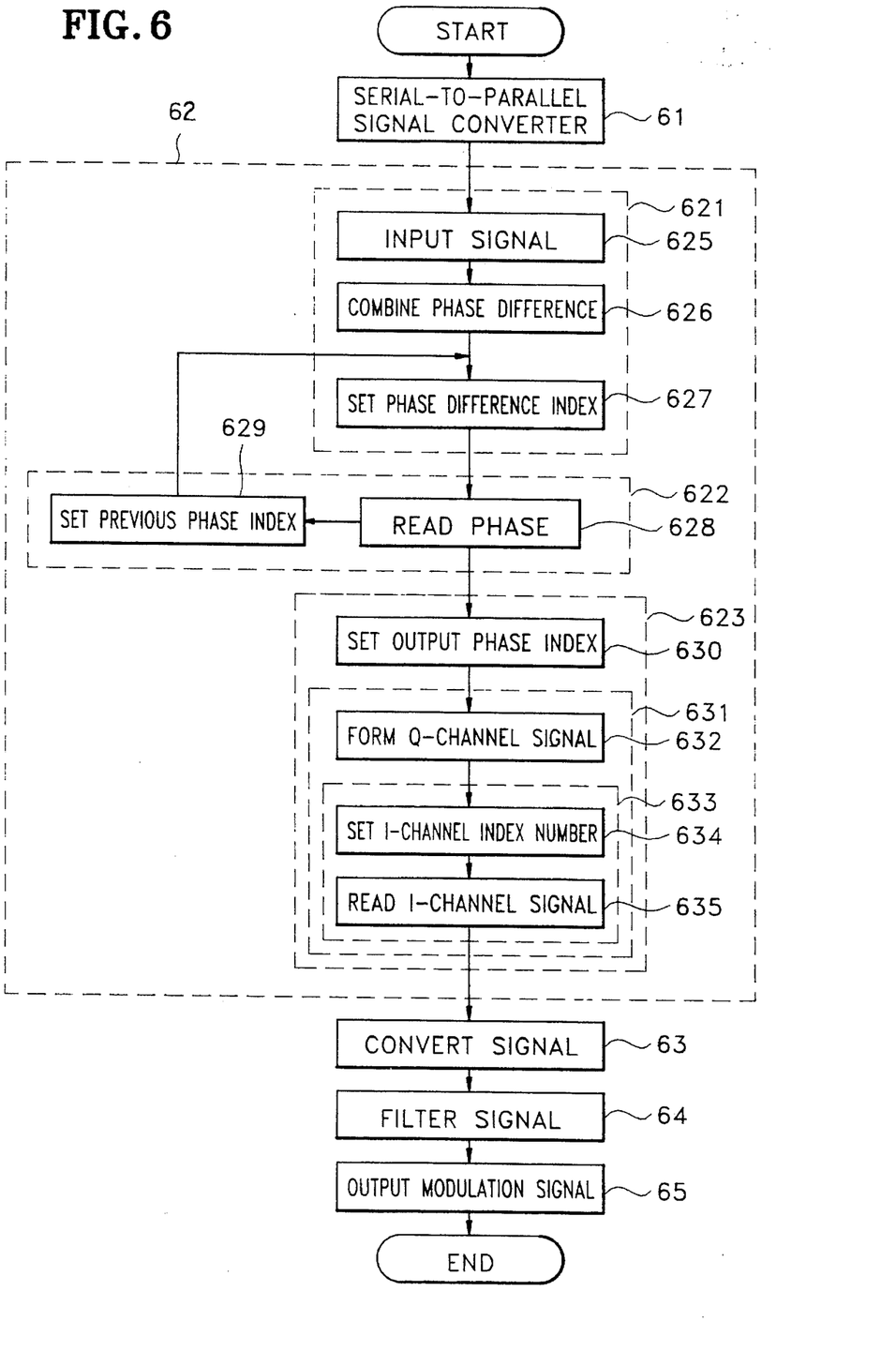
FIG. 6 is a flowchart diagram of a DEQPSK modulation method according to another embodiment of the present invention.

FIG. 6 is a flowchart diagram of a DEQPSK modulation method according to another embodiment of the present invention.

As shown in FIG. 6, a DEQPSK modulation method comprises the steps of converting serially input modulation data, that is, binary signal train $b_m$ into the $X_K$ and $Y_K$ signal trains, in step 61, forming a signal for reading phase values $\phi_K$ of I- and Q-channel signals using the phase difference ($\Delta\phi$) between $X_K$ and $Y_K$ which are serially input and previous phase $\phi_{K-1}$ in step 62, converting each of the thus-formed signals $I_K$ and $Q_K$ into analog signals in step 63, baseband-pass-filtering the two analog-converted signals $I_K$ and $Q_K$ in step 64, and mixing the two filtered signals and outputting a final modulation signal in step 65.

Signal forming step 62 comprises a step 621 for setting an index of phase difference $\Delta\phi$ of signals $X_K$ and $Y_K$ which are serially input after being converted into binary signal trains, a step 622 for forming the current phase value using the formed phase difference index value and the previous phase value, and a step 623 for obtaining I- and Q-channel signals using the set phase value.

Phase difference forming step 621 comprises a step 625 for receiving the two input signals $X_K$ and $Y_K$, a step 626 for combining signals $X_K$ and $Y_K$ and obtaining a phase difference $\Delta\phi$, and a step 627 for setting an index of phase difference $\Delta\phi$.

Phase forming step 622 comprises a step 628 for reading phase value $\phi_K$ from storage unit 521 using the set phase difference index value and previous phase value $\phi_{K-1}$, and a step 629 for storing the determined current phase value $\phi K$ as previous phase value $\phi_{K-1}$ in a look-up table.

Channel signal forming step 623 comprises a step 630 for setting an index of the projection value of the phase using phase value $\phi_K$, and a step 631 for reading the I- and Q-channel signals $I_K$ and $Q_K$ from the storage unit 521 using the output index.

Signal reading step 631 comprises a step 632 for reading a Q-channel signal corresponding to the output phase index number when a channel signal stored in storage unit 521 is a signal based on the Q-channel, and a step 633 for reading an I-channel signal corresponding to a number obtained by incrementing the output phase index number by two I-channel signal forming step 633 comprises a step 634 for forming an I-channel index number obtained by incrementing the output phase index number by two, and a step 635 for reading an I-channel signal corresponding to the I-channel index number from the storage unit.

Hereinafter, the DEQPSK modulation method according to another embodiment of the present invention having the above construction will be described together with the DEQPSK modulation apparatus.

Serially input modulation signal train $b_m$ is converted into binary data trains $X_K$ and $Y_K$ for representing the degree of phase variation which is modulated according to the input signal via signal converter 51 in step 61. Accordingly, starting from a first bit of the input signal $b_m$, odd-numbered bits and even-numbered bits are separated into $X_K$ and $Y_K$ trains, respectively. At step 625 of step 621, the two signal trains $X_K$ and $Y_K$ are input. At step 626, controller 522 obtains phase difference $\Delta\phi$ by way of combining the input data trains. At step 627, a discriminated number is set with respect to the phase difference value formed by the combined signal. The phase difference index values are stored in a look-up table in storage unit 521 in the same manner as that represented in following Table 2.

TABLE 2

| $X_K$ | $Y_K$ | $\Delta\phi$ | index number |
|---|---|---|---|
| 0 | 0 | $\pi/4$ | 0 |
| 0 | 1 | $3\pi/4$ | 1 |
| 1 | 1 | $5\pi/4$ | 3 |
| 1 | 0 | $7\pi/4$ | 2 |

At step 628 of step 622, controller 522 uses the formed phase difference index and the previous phase value to read the current phase value from storage unit 521. Accordingly, the respective phase difference index which is designated as two data trains $X_K$ and $Y_K$ and the previous phase value are used to obtain modulation phase values to be desired with respect to phase differences (0, $\pi/4$, $3\pi/4$, $5\pi/4$ and $7\pi/4$) which is taken by previous phase value $\phi_{K-1}$, by way of reading the modulated phase values from the look-up table formed by storage unit 521. That is, current phase value $\phi_K$ is a value obtained by adding an amount of phase variation $\Delta\phi$ to previous phase value $\phi_{K-1}$ with respect to previous phase value $\phi_{K-1}$ and the amount of phase variation $\Delta\phi$ to be modulated. Therefore, current phase value $\phi_K$ is obtained by way of reading the phase value corresponding to the set phase index number from storage unit 521.

The phase index value and the previous phase index value are stored in the look-up table of storage unit 521 in the same manner as that represented in Table 3.

TABLE 3

| previous phase value | previous phase corresponding number | index number | | | |
|---|---|---|---|---|---|
| | | 0 | 1 | 2 | 3 |
| 0 | 0 | 1 | 3 | 7 | 5 |
| $\pi/4$ | 1 | 2 | 4 | 0 | 6 |
| $\pi/2$ | 2 | 3 | 5 | 1 | 7 |
| $3\pi/4$ | 3 | 4 | 6 | 2 | 0 |
| $\pi$ | 4 | 5 | 7 | 3 | 1 |
| $5\pi/4$ | 5 | 6 | 0 | 4 | 2 |
| $3\pi/2$ | 6 | 7 | 1 | 5 | 3 |
| $7\pi/4$ | 7 | 0 | 2 | 6 | 4 |

At step 629, phase value $\phi_K$ is indexed as previous phase value $\phi_{K-1}$ so as to be stored in storage unit 521. The number corresponding to the determined phase value becomes again previous phase value $\phi_{K-1}$. Accordingly, the phase value corresponds to a point which is intersected with the index number according to next input phase difference $\Delta\phi$ in the look-up table of storage unit 521 as represented in Table 3.

At step 630 of step 623, the phase value formed at step 622 is input. Accordingly, the index numbers are determined with respect to the projection values (obtained by taking sine and cosine values) of the phase value for obtaining final phase values $I_K$ and $Q_K$ of the I- and Q-channels corresponding to the phase value. At step 631, final phase values $I_K$ and $Q_K$ of the I- and Q-channels according to the determined index numbers are read from storage unit 521, and the read final phase values $I_K$ and $Q_K$ are output.

At step 632 of step 631, when the channel signal stored in storage unit 521 is a signal based on the Q-channel, the Q-channel signal corresponding to the output phase index number is read. At step 634 of step 633, the output phase index number is incremented by two, to form the I-channel index number. Thereafter, the I-channel signal corresponding to the I-channel index number formed in I-channel signal reading step 635 is read from storage unit 521.

Here, the projection values of the phase stored in the storage unit are easily obtained by taking the sine and cosine values of the formed phase value $\phi_K$. These projection values are composed of the values 0, +1 and ±√2 as represented in Table 4, in correspondence to the respective phase values shown in FIG. 2.

TABLE 4

| $\phi_K$ | 0 | π/4 | π/2 | 3π/4 | π | 5π/4 | 3π/2 | 7π/4 |
|---|---|---|---|---|---|---|---|---|
| sin$\phi_K$ | 0 | 1/√2 | 1 | 1/√2 | 0 | −1/√2 | −1 | −1/√2 |
| cos$\phi_K$ | 1 | 1/√2 | 0 | −1/√2 | −1 | −1/√2 | 0 | 1/√2 |

Here, when the channel signal stored in storage unit 521 is a signal based on the Q-channel signal, final phase value $Q_K$ of the Q-channel is stored in the look-up table of storage unit 521 in the same manner as that represented in Table 5.

TABLE 5

| index number | 0 | 1 | 2 | 3 | 4 | 5 | 6 | 7 | 8 | 9 |
|---|---|---|---|---|---|---|---|---|---|---|
| corres. $\phi_K$ value | 0 | π/4 | π/2 | 3π/4 | π | 5π/4 | 3π/2 | 7π/4 | 0 | π/4 |
| Q-channel signal | 0 | 1/√2 | 1 | 1/√2 | 0 | −1/√2 | −1 | −1/√2 | 0 | 1/√2 |

When the channel signal stored in the storage unit is a signal based on the I-channel, the output phase index number of the I-channel is set by subtracting two from the output phase index number. Here, final phase value $I_K$ of the Q-channel is stored in the look-up table of storage unit in the same manner as that represented in following Table 6.

TABLE 6

| index number | 0 | 1 | 2 | 3 | 4 | 5 | 6 | 7 | 8 | 9 |
|---|---|---|---|---|---|---|---|---|---|---|
| corres. $\phi_K$ value | π/2 | 3π/4 | π | 5π/4 | 3π/2 | 7π/4 | 0 | π/4 | π/2 | 3π/4 |
| I-channel signal | 1 | 1/√2 | 0 | −1/√2 | −1 | −1/√2 | 0 | 1/√2 | 1 | 1/√2 |

At step 631, the set index values of the sine and cosine values are used. Accordingly, controller 522 easily reads the final phase value of the I and Q-channels from storage unit 521, and outputs the read final phase value.

Final phase values $I_K$ and $Q_K$ which are obtained by the above method are converted into the analog signals via digital-to-analog converter 53 in step 63. Then, the analog-converted signals are filtered in step 64 via baseband filter 54.

At step 65, the filtered signals $I_K$ and $Q_K$ are multiplied in first and second multipliers 56 and 57 by the carrier fc and the carrier signal which is shifted by 90° in phase shifter 55, respectively. The two multiplied signals are mixed by mixer 58 in step 64, to output the final modulation signal.

Here, the characteristics of baseband filter 54 are determined according to a filter function H(f)

$$|H(F)| = 1 \quad \text{when } 0 \leq f \leq \frac{1-\alpha}{2T}$$

$$|H(F)| = \sqrt{1/2 \left( 1 - \sin\left( \pi \frac{2fT-1}{2\alpha} \right) \right)}$$

$$\text{when } \frac{1-\alpha}{2T} \leq f \leq \frac{1+\alpha}{2T}$$

$$|H(F)| = 0 \quad \text{when } f \geq \frac{1+\alpha}{2T}$$

wherein α represents a roll-off factor, T is a sampling period, t is time, and f is frequency. Using the above-determined filter function, the baseband-pass-filtered signal via baseband filter 54 is modulated into the same signal as that represented in Equation 1.

$$X(t) = \sum_n g(t - nT)\cos\phi_n\cos\tilde{\omega}_c t - \sum_n g(t - nT)\sin\phi_n\sin\tilde{\omega}_c t \quad (1)$$

wherein X(t) represents a resultant transmission signal, g(t) is a pulse shaping function, n is an integer representing a sampling at the n-th sampling point, and $\omega_c$ is the carrier frequency.

Thus, in the DEQPSK modulation method and apparatus, the phase difference which is formed according to each symbol is used after being assigned with the index. The final modulation output phase together with the previous phase value is directly obtained by using the look-up table. The two channel signals are also obtained by using the index table. Accordingly, the construction of the circuit is simplified and the size of the chip is reduced due to the low power consumption. Also, the modulation speed is improved and the reliable modulation signal can be formed.

What is claimed is:

1. A π/4 differentially encoded quadrature phase shift keying (DQPSK) modulation method for use in a method for forming in-phase (I) and quadrature (Q) channel signals of a π/4 DQPSK modulation apparatus, said modulation method comprising the steps of:

(a) converting input binary data stream $b_m$ into two separate binary streams $X_k$ and $Y_k$ using a signal converter, wherein all odd-numbered bits form stream $X_k$ and all even-numbered bits form stream $Y_k$, starting from the first bit in time of stream $b_m$;

(b) setting a phase variation value index to obtain an index corresponding to a phase variation value having said two separate binary streams $X_k$ and $Y_k$ from the signal converter;

(c) forming an output phase index value from an output phase index value decision table in which the previous phase index value and the phase variation index value are used; and (d) forming I- and Q-channel signals $I_k$ and $Q_k$ by way of obtaining I-projection value which is the output cosine value corresponding to an output phase value and Q-projection value which is the output sine value corresponding to an output phase value obtained using an output value decision table formed by either sine or cosine value based on said output phase index values using said output phase index value, by way of the further steps of:

(e) forming said quadrature signal according to the determined quadrature projection value from the output phase index value decision table by using said output phase index value; and (f) forming said in-phase signal according to the determined in-phase projection value from the output value decision table by using said output phase index value.

2. A π/4 DQPSK modulation method as claimed in claim 1, wherein said phase variation index value is obtained by way of determining said two separate binary streams $X_k$ and $Y_k$ according to the following table,

| $X_K$ | $Y_K$ | Δφ | phase variation index value |
|---|---|---|---|
| 0 | 0 | π/4 | 0 |
| 0 | 1 | 3π/4 | 1 |
| 1 | 1 | 5π/4 | 3 |
| 1 | 0 | 7π/4 | 2 | wherein all odd-numbered bits form stream $X_k$ and all even-numbered bits form stream $Y_k$, starting from the first bit in time of stream $b_m$, and Δφ represents phase variation determined by said two separate binary streams $X_k$ and $Y_k$.

3. A π/4 DQPSK modulation method as claimed in claim 1, wherein said output phase index value decision table is for determining the output phase index value using said previous phase index value and said phase variation index value according to the following table

| previous phase value | previous phase index value | phase variation index value | | | |
|---|---|---|---|---|---|
| | | 0 | 1 | 2 | 3 |
| 0 | 0 | 1 | 3 | 7 | 5 |
| π/4 | 1 | 2 | 4 | 0 | 6 |
| π/2 | 2 | 3 | 5 | 1 | 7 |
| 3π/4 | 3 | 4 | 6 | 2 | 0 |
| π | 4 | 5 | 7 | 3 | 1 |
| 5π/4 | 5 | 6 | 0 | 4 | 2 |
| 3π/2 | 6 | 7 | 1 | 5 | 3 |
| 7π/4 | 7 | 0 | 2 | 6 | 4 |

4. A π/4 DQPSK modulation method as claimed in claim 1, wherein said output value decision table, in which the extended index values and corresponding output values for determining the values of I- and Q-channel signals using only one table by index value control are used, is for determining the quadrature projection value by using the output phase index value determined from said output phase index value decision table, and the in-phase projection value by using the output phase value according to the following table

| index value | 0 | 1 | 2 | 3 | 4 | 5 | 6 | 7 | 8 | 9 |
|---|---|---|---|---|---|---|---|---|---|---|
| corres. $\phi_K$ value | 0 | π/4 | π/2 | 3π/4 | π | 5π/4 | 3π/2 | 7π/4 | 0 | π/4 |
| Q-channel signal | 0 | 1/√2 | 1 | 1/√2 | 0 | −1/√2 | −1 | −1/√2 | 0 | 1/√2 |

5. A π/4 DQPSK modulation method as claimed in claim 1, wherein said step (d) comprises the steps of:

(a) setting an output phase index of the projection value using the output phase value; and (b) determining I- and Q-channel signals from said output value decision table using said output phase index value.

6. A π/4 DQPSK modulation method as claimed in claim 5, wherein said step (b) comprises the steps, of:

(a) reading a quadrature projection value corresponding to the output phase index value from said output value decision table when the projection values in said output value decision table are based on a Q-channel; and (b) reading an in-phase projection value corresponding to the output phase index value obtained by adding to the output phase index value from said output value decision table.

7. A π/4 DQPSK modulation method as claimed in claim 6, wherein said step (b) comprises the steps of:

(a) forming an I-channel index value by adding two to the output phase index value; and (b) reading an in-phase projection value corresponding to the I-channel index value from said output value decision table.

8. A π/4 DQPSK modulation apparatus comprising:

signal converting means for converting serially input binary data stream $b_m$ into two separate binary streams $X_k$ and $Y_k$;

signal forming means for determining an output phase index value corresponding to an output phase determined by a phase variation index value and a previous phase index value, and in-phase and quadrature channel signals $I_k$ and $Q_k$ from an output value decision table, in which either in-phase or quadrature projection value corresponding to the extended output phase index values are used, by using the output phase index value in storage unit means and control means, wherein the phase variation index value corresponds to the phase variation having of two separate binary streams $X_k$ and $Y_k$ from said signal converting means, the previous phase index value corresponds to the output phase index at the previous pulse time for using the output phase index value decision table, the projection values are sine or cosine value corresponding to the output phase values, the Q-channel based projection values represent sine values corresponding to the output phases, and the I-channel based projection values represent cosine values corresponding to the output phases;

digital-to-analog converting means for converting said I- and Q-channel signals into analog signals;

baseband filtering means for baseband-filtering said analog-converted signals output from said digital-to-analog converting means;

phase shifting means for shifting the phase of a carrier by 90° (π/2) to provide an in-phase carrier signal and a quadrature carrier signal 90° out of phase with carrier signal;

first and second multipliers for multiplying said two baseband-pass filtered signals by said carrier and the phase-shifted-by-90° signal, respectively; and mixing means for combining said multiplied signals output from said multipliers and outputting a combined signal.

9. A π/4 DQPSK modulation apparatus as claimed in claim 8, wherein said signal forming means comprises:

storage unit means for storing an output phase index value corresponding to the phase variation index and the previous output phase index value, and storing projection values corresponding to the extended output phase index values; and control means for obtaining the output phase index value, the I- and Q-channel signals using said two separate binary streams $X_k$ and $Y_k$, the output phase index values, the projection values and the output phase index values of said storage unit means.

10. A π/4 DQPSK modulation apparatus as claimed in claim 8, wherein said two separate binary streams $X_k$ and $Y_k$ determines a phase variation index value according to the following table

| $X_K$ | $Y_K$ | Δφ | phase variation index value |
|---|---|---|---|
| 0 | 0 | π/4 | 0 |
| 0 | 1 | 3π/4 | 1 |
| 1 | 1 | 5π/4 | 3 |
| 1 | 0 | 7π/4 | 2 | wherein all odd-numbered bits form stream $X_k$ and all even-numbered bits form stream $Y_k$, starting from the first bit in time of stream $b_m$, and Δφ represents phase variation determined by said two separate binary streams $X_k$ and $Y_k$, and an output phase index value is determined by theprevious phase index value and the phase variation index value according to the following table

| previous phase value | previous phase index value | phase variation index value | | | |
|---|---|---|---|---|---|
| | | 0 | 1 | 2 | 3 |
| 0 | 0 | 1 | 3 | 7 | 5 |
| π/4 | 1 | 2 | 4 | 0 | 6 |
| π/2 | 2 | 3 | 5 | 1 | 7 |
| 3π/4 | 3 | 4 | 6 | 2 | 0 |
| π | 4 | 5 | 7 | 3 | 1 |
| 5π/4 | 5 | 6 | 0 | 4 | 2 |
| 3π/2 | 6 | 7 | 1 | 5 | 3 |
| 7π/4 | 7 | 0 | 2 | 6 | 4 |

11. A π/4 DQPSK modulation apparatus as claimed in claim 8, wherein said I- and Q-channel signals are determined by the extended output phase index value according to the following output value decision table

| index value | 0 | 1 | 2 | 3 | 4 | 5 | 6 | 7 | 8 | 9 |
|---|---|---|---|---|---|---|---|---|---|---|
| corres. $φ_K$ value | 0 | π/4 | π/2 | 3π/4 | π | 5π/4 | 3π/2 | 7π/4 | 0 | π/4 |
| Q-channel signal | 0 | 1/√2 | 1 | 1/√2 | 0 | −1/√2 | −1 | −1/√2 | 0 | 1/√2 |

12. A π/4 DQPSK modulation apparatus as claimed in claim 11, wherein said Q-channel signal is determined by reading a quadrature projection value corresponding to the output phase index value from said output value decision table when the projection values in said output value decision table are based on the Q-channel, and said I-channel signal is determined by reading an in-phase projection value corresponding to the output phase index value obtained by adding two to the output phase index value from said output value decision table.

* * * * *

UNITED STATES PATENT AND TRADEMARK OFFICE
CERTIFICATE OF CORRECTION

PATENT NO. : 5,546,428
DATED : August 13, 1996
INVENTOR(S) : Il-Hyun NAM et al.

It is certified that error appears in the above-indentified patent and that said Letters Patent is hereby corrected as shown below:

Column 2 between lines 40-45 the equations should read as follows:

$$I_K = \{I_{K-1} \cdot \cos[\Delta\phi(X_K, Y_K)]\} - \{Q_{K-1} \cdot \sin[\Delta\phi(X_K, Y_K)]\}$$

$$Q_K = \{I_{K-1} \cdot \sin[\Delta\phi(X_K, Y_K)]\} + \{Q_{K-1} \cdot \cos[\Delta\phi(X_K, Y_K)]\}$$

Signed and Sealed this

Twenty-ninth Day of April, 1997

Attest:

BRUCE LEHMAN

Attesting Officer

Commissioner of Patents and Trademarks